(12) United States Patent
Jung

(10) Patent No.: US 7,412,268 B2
(45) Date of Patent: Aug. 12, 2008

(54) MOBILE TERMINAL HAVING BATTERY LOCKING UNIT

(75) Inventor: Yun Taek Jung, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 318 days.

(21) Appl. No.: 10/879,206

(22) Filed: Jun. 30, 2004

(65) Prior Publication Data

US 2005/0003860 A1    Jan. 6, 2005

(30) Foreign Application Priority Data

Jul. 5, 2003     (KR) ...................... 10-2003-0045516

(51) Int. Cl.
    *H04M 1/00*     (2006.01)
(52) U.S. Cl. ............................... 455/575.1; 379/433.08
(58) Field of Classification Search ................ 455/572, 455/575.1, 557, 575.4, 575.8; 379/433.08, 379/433.11, 433.12; 439/137
    See application file for complete search history.

(56) References Cited

U.S. PATENT DOCUMENTS 5,607,792 A    3/1997   Garcia et al. .................. 429/97
6,515,450 B1*  2/2003   Kaiho et al. ................. 320/112
2004/0048638 A1* 3/2004 Inomata et al. ............. 455/572
2004/0204176 A1* 10/2004 Park ........................... 455/572
2007/0093140 A1* 4/2007  Begic et al. ................. 439/676

FOREIGN PATENT DOCUMENTS

| CN | 1450674 | 10/2003 |
| GB | 2294357 | 4/1996 |
| GB | 2294357 A * | 4/1996 |

OTHER PUBLICATIONS

U.S. Appl. No. 60/468,431, filed Apr. 2003, Begic et al.*
Chinese Search Report dated Nov. 16, 2007.

* cited by examiner

*Primary Examiner*—Duc Nguyen
*Assistant Examiner*—Chuck Huynh
(74) *Attorney, Agent, or Firm*—Ked & Associates, LLP

(57) ABSTRACT

A mobile terminal is provided that includes a terminal body having a battery receiving part, a battery received on the battery receiving part, a battery cover mounted at a rear side of the terminal body, and a battery locking unit for fixing the battery to the terminal body. The battery locking unit may prevent release of the battery due to an external impact.

33 Claims, 7 Drawing Sheets

MOBILE TERMINAL HAVING BATTERY LOCKING UNIT

The present application claims priority from Korean Patent Application No. 45516/2003, filed Jul. 5, 2003, the subject matter of which is incorporated herein by reference

BACKGROUND OF THE INVENTION

1. Field of the Invention

Embodiments of the present invention may relate to a mobile terminal. More particularly, embodiments of the present invention may relate to a mobile terminal capable of preventing separation of a battery from a terminal body even if external impact is applied.

2. Background of Related Art

A mobile terminal is a compact wireless communication device by which a user can make a phone call or exchange data without restriction as to place or distance. The mobile terminal is a critical communication unit in the current Information Age.

FIG. 1 is an exploded perspective view of a mobile terminal according to an example arrangement. FIGS. 2 and 3 are sectional views showing a battery coupling structure of the mobile terminal according to an example arrangement. Other arrangements are also possible.

The mobile terminal may include a terminal body 104 having a battery receiving part 102 at a rear side of the terminal body 104, a battery 106 mounted on the battery receiving part 102 to supply power to a terminal, a battery cover 108 detachably attached to the terminal body 104 to protect the battery 106, and a locking unit to lock the battery 106 to the terminal body 104.

The locking unit may include a first locking unit, a second locking unit and a third locking unit. The first locking unit may be formed between the battery covet 108 and the terminal body 104 to detachably lock the battery cover 108 to the terminal body 104. The second locking unit may be formed between the battery 106 and the terminal body 104 to fix the battery 106 onto the battery receiving part 102. The third locking unit may slidably couple the battery cover 108 to the terminal body 104.

The first locking unit may include a locking rib 120, a button 122 and a locker 124. The locking rib 120 may be formed at an upper portion of the battery cover 108. The button 122 may be installed at the rear side of the terminal body 104 and may be manipulated by a user. The locker 124 may be locked to or unlocked from the locking rib 120 according to manipulation of the button 122.

As shown in FIG. 2, the second locking unit may include a locking hook 110 vertically protruding from both edges of the battery receiving part 102, and a locking protrusion 112 protruding from both sides of the battery 105 and engaged with the locking hook 110.

When the battery 106 is mounted on the battery receiving part 102, the locking protrusion 112 formed at the battery may be locked to the looking hook 110 formed at the battery receiving part 102 to maintain the battery 106 received in the battery receiving part 102. The locking hook 110 may be maintained locked to the locking protrusion 112 by virtue of a self-elastic force.

FIG. 3 shows that the third locking unit may include hooking jaws 130 vertically protruding from both edges of the battery receiving part 102 with its end portions bent outwardly, and a hooking rib 132 protruding inwardly from both inner sides of the battery cover 108 so as to be inserted into the hooking jaw 130.

When the battery cover 108 is mounted at the battery receiving part 102 of the terminal body 104 and slid in a longitudinal direction of the terminal, the hooking rib 132 of the battery cover 108 may be inserted in the hooking jaw 130 of the terminal body 104, whereby the battery cover 108 is fixed at the terminal body 104.

However, the interval (Q) between the locking hook 110 and the inner side of the battery cover 108 may be larger than the interval (P) where the locking hook 110 and the locking protrusion 112 overlap. Thus, if an external impact is applied to the mobile terminal (i.e., if the mobile terminal is inadvertently dropped), the locking hook 110 may be elastically deformed and released from the locking protrusion 112. Thus, the battery may be released from the battery receiving part 102 and thereby cause a problem that an error may occur in a circuit due to the power being OFF.

In addition, the hooking rib 132 of the cover 108 may be insertedly fixed at the hooking jaw 130 of the terminal body 104 so that if an external impact is applied to the mobile terminal (i.e., if the mobile terminal is inadvertently dropped), both sides of the battery cover 108 may be opened to release the hooking rib 132 from the hooking jaw 130. Then, the battery cover 108 may separate from the battery cover 108 and the battery 106 may be separated from the battery receiving part 102.

SUMMARY OF THE INVENTION

Embodiments of the present invention may provide a mobile terminal capable of preventing separation of a battery from a terminal body even if an external impact is applied to the mobile terminal. This may be provided by a structure of a battery locking unit.

A mobile terminal is provided that includes a terminal body having a battery receiving part, a battery received on the battery receiving part, a battery cover mounted at a rear side of the terminal body, and a battery locking unit for fixing the battery to the terminal body. The battery locking unit may include hooking jaws, hooking ribs and release preventing protrusions. The hooking jaws may be formed at both sides of the battery receiving part of the terminal body. The hooking ribs may protrude from both inner sides of the battery cover and slidably couple to the hooking jaws. The release preventing protrusions may protrude from both sides of the battery receiving part to prevent release of the hooking ribs from the hooking jaws.

The hooking rib may include a first hooking portion protruded inwardly from both inner sides of the battery cover and inserted to the hooking jaw and a second hooking portion downwardly bent from an end portion of the first hooking portion and supported by the side of one of the release preventing protrusions.

The release preventing protrusions may protrude at certain intervals from the hooking jaws from both edges of the rear surface of the terminal and support the second hooking portion of the hooking rib so that the hooking rib may not be separated from the hooking jaw.

A mobile terminal may be provided that includes a terminal body having a battery receiving part, a battery, a battery cover and a battery locking unit. The battery may be received on the battery receiving part. The battery cover may be mounted at a rear side of the terminal body. The battery locking unit may fix the battery to the terminal body. The battery locking unit may include locking hooks protruding from both sides of the battery receiving part. Locking protrusions may protrude from both sides of the battery and lock to the locking hook. Support ribs may be formed at both inner sides of the battery cover and prevent the locking hook from being released from the locking protrusion. The support rib may be inwardly protruding from the inner side of the battery cover so as to face the locking hook.

An interval (T) between the locking hook and the support rib may be smaller than an interval (S) where the locking hook and the locking protrusion overlap.

Other objects, features, aspects, advantages and embodiments of the present invention may become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate arrangements and embodiments of the invention and together with the description may serve to explain the principles of the invention.

The following represents brief descriptions of the drawings in which like reference numerals represent like elements and wherein.

DETAILED DESCRIPTION OF PREFERRED EMBODIMENTS

Figure 1:
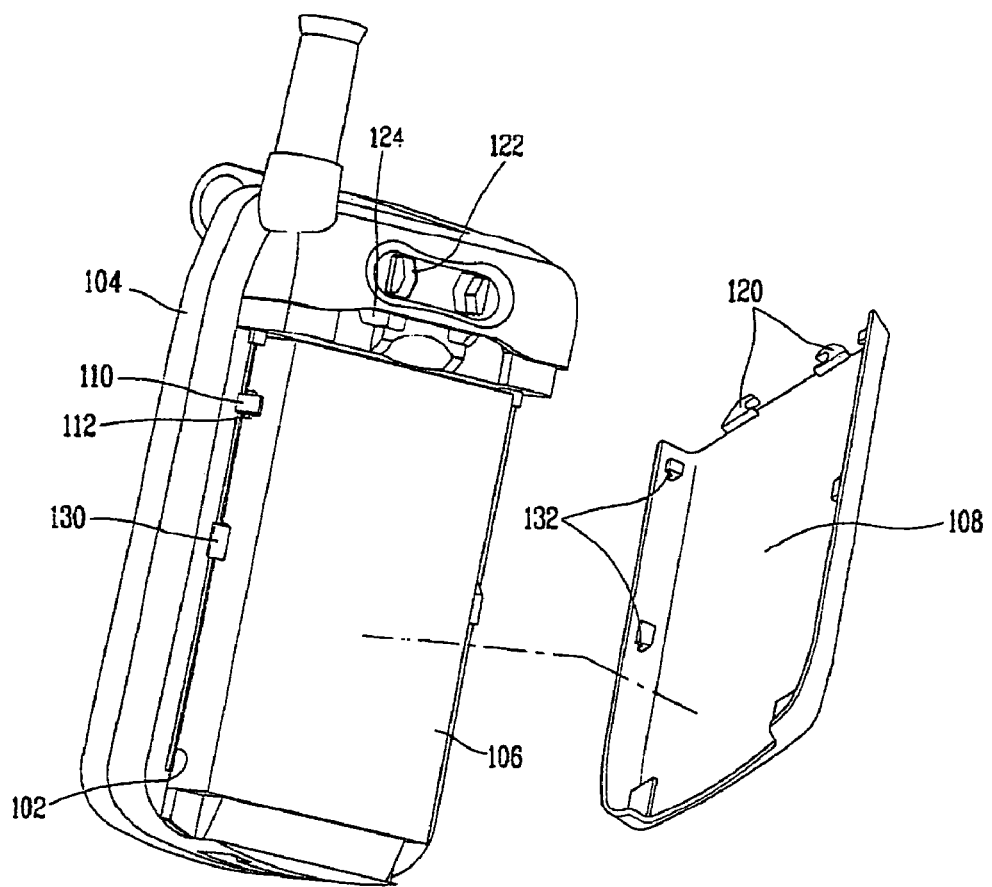
FIG. 1 is an exploded perspective view of a mobile terminal in accordance with an example arrangement.
Figure 2:
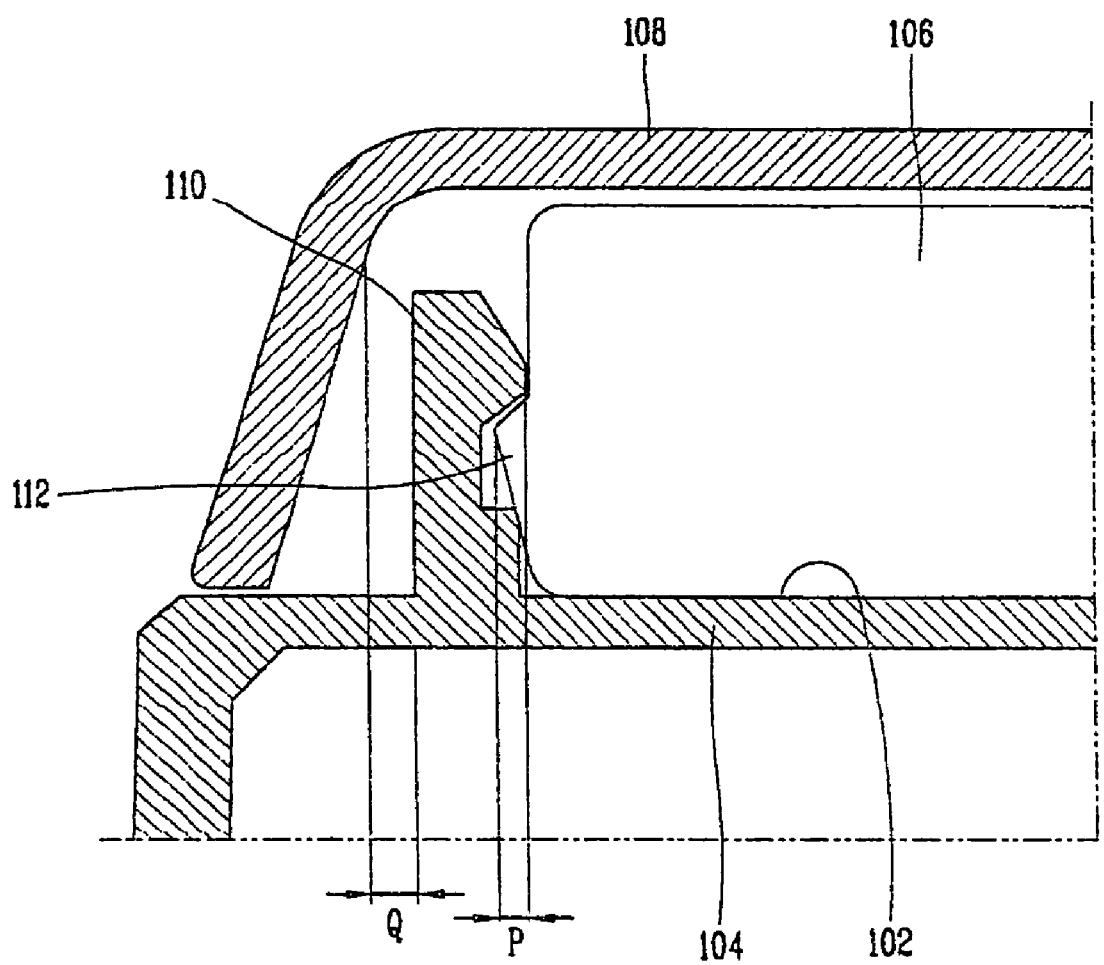
FIG. 2 is a partial sectional view showing a locking structure between a battery and a terminal body of the mobile terminal in accordance with an example arrangement.
Figure 3:
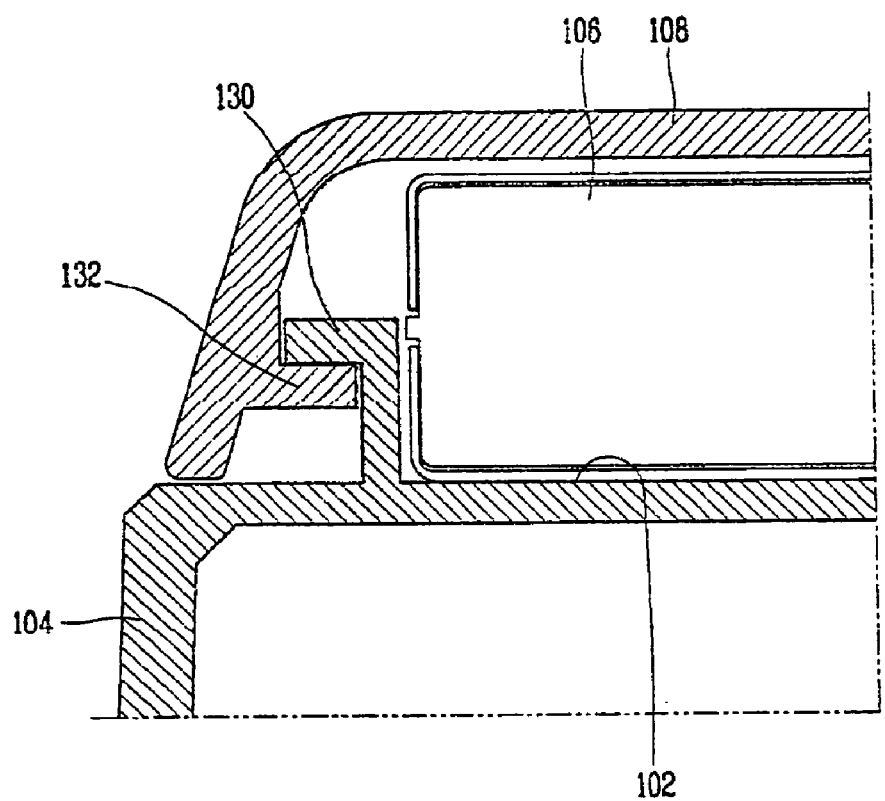
FIG. 3 is a partial sectional view showing a locking structure between a battery cover and the terminal body in accordance with an example arrangement.
Figure 4:
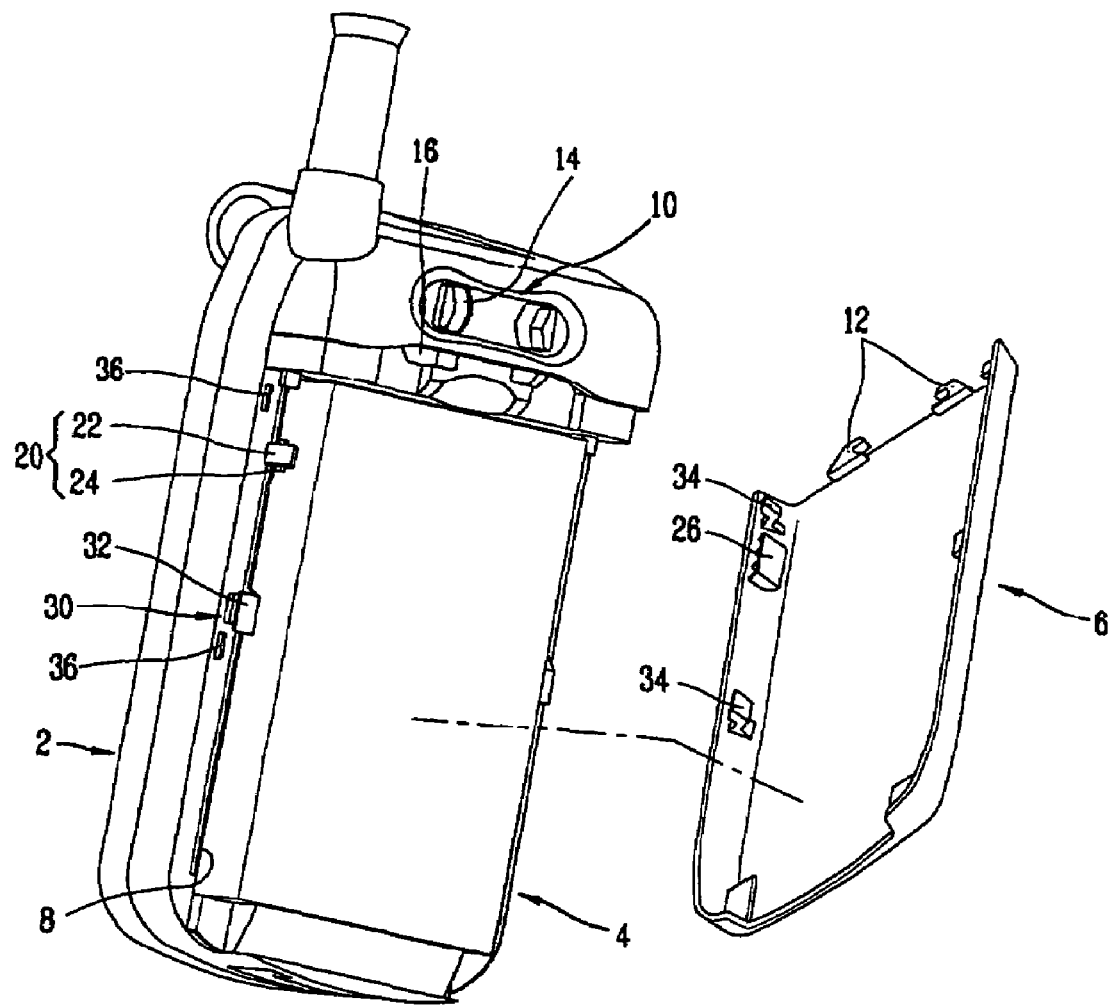
FIG. 4 is an exploded perspective view of a mobile terminal in accordance with an example embodiment of the present invention.

FIG. 4 is an exploded perspective view of a mobile terminal in accordance with an example embodiment of the present invention. Other embodiments and configurations are also within the scope of the present invention. More specifically, the mobile terminal may include a terminal body 2 having a circuit board inserted therein and various operation buttons for manipulating the terminal formed at a front surface thereof. A battery 4 may be received on a receiving part 8 formed at a rear side of the terminal body 2. A battery cover 6 may be detachably mounted at the rear side of the terminal body 2 to protect the battery 4. A battery locking unit may lock the battery 4 to the terminal body 2.

The battery locking unit may include a first locking part 10, a second locking unit 20 and a third locking unit 30. The first locking unit 10 may be formed between the rear surface of the terminal body 2 and one side of the battery cover 6 to detachably attach the battery cover 6 to the terminal body 2. The second locking unit 20 may be formed between both edges of the battery receiving part 8 and both sides of the battery 4 to maintain the battery 4 in the battery receiving part 8. The third locking unit 30 may be formed between both sides of the battery cover 6 and both sides of the battery receiving part 8 to allow the battery cover 6 to be slidably coupled to the terminal body 2.

The first locking unit 10 may include two locking ribs 12, buttons 14 and a locker 16. The two locking ribs 12 may protrude from the upper portion of the battery cover 6 or the buttons 14 may be installed at a rear surface of the terminal body 2 and may be manipulated by a user. The locker 16 may be connected to the button 14 and locked to or unlocked from the locking rib 12 according to manipulation of the button 14.

Figure 5A:
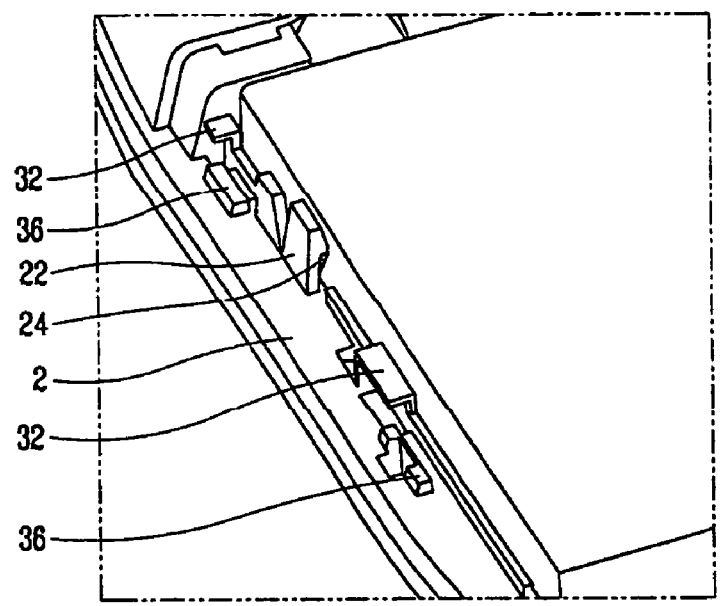
FIGS. 5A and 5B are partial exploded perspective views showing a locking structure between a battery and a terminal body of the mobile terminal in accordance with an example embodiment of the present invention.
Figure 5B:
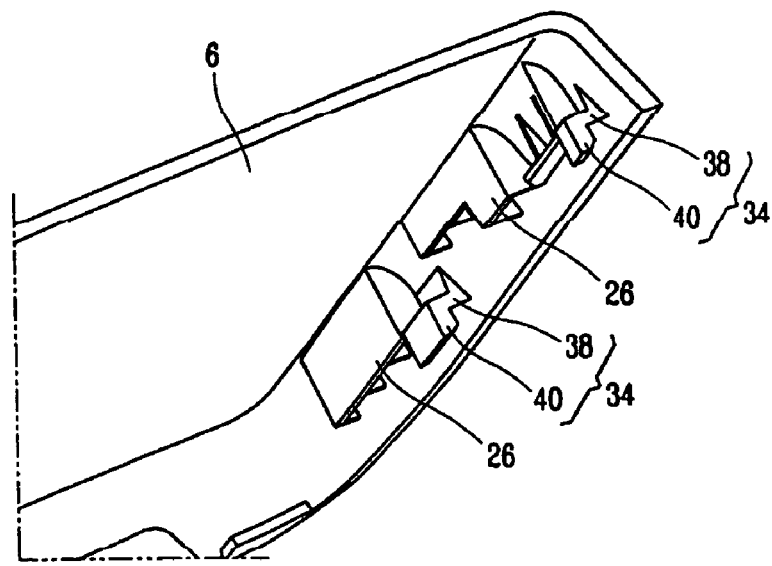
Figure 6:
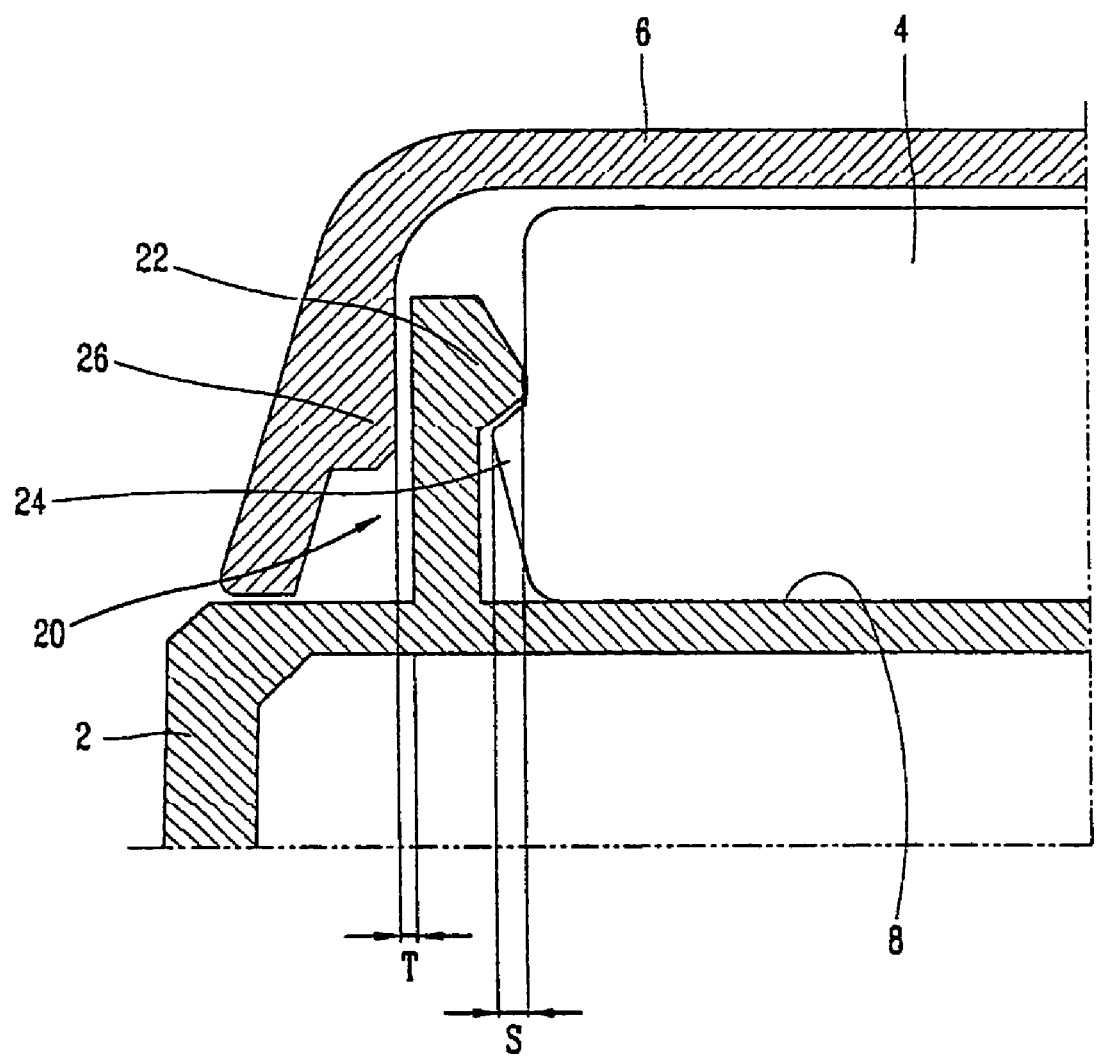
FIG. 6 is a partial sectional view showing a locking structure between a battery cover and the terminal body in accordance with an example embodiment of the present invention.

FIGS. 5A and 5B are partial exploded perspective views and FIG. 6 is a partial sectional view showing a locking structure between a battery and a terminal body of the mobile terminal in accordance with example embodiments of the present invention. Other embodiments and configurations are also within the scope of the present invention.

As shown in FIG. 6, the second locking unit 20 may include locking hooks 22, locking protrusions 24 and support ribs 26. The locking hooks 22 may vertically protrude from both sides of the battery receiving part 8 of the terminal body 2. The locking protrusions 24 may protrude from both sides of the battery 4 and lock to the locking hook 22. The support ribs 26 may be formed at both inner sides of the battery cover 6 and prevent the locking hook 22 from being released from the locking protrusion 24.

The locking hook 22 may be maintained in a state of being engaged to the locking protrusion 24 by virtue of a self-elastic force. The support rib 26 may protrude inwardly from an inner side of the battery cover 6 for a predetermined width and may face the locking hook 22.

An interval (T) between the locking hook 22 and the support rib 26 may be smaller than an interval (S) where the locking hook 22 and the locking protrusion 24 overlap. In other words, the interval (S) where the locking hook 22 and the locking protrusion 24 overlap may be 0.4 mm, whereas the interval (T) between the support rib 26 and the locking hook 22 may be 0.2 mm, so that even if the locking hook 22 is elastically deformed due to an external impact, the amount of deformation of the locking hook 22 is not greater than 0.2 mm. This may prevent release of the locking hook 22 from the locking protrusion 24.

Figure 7:
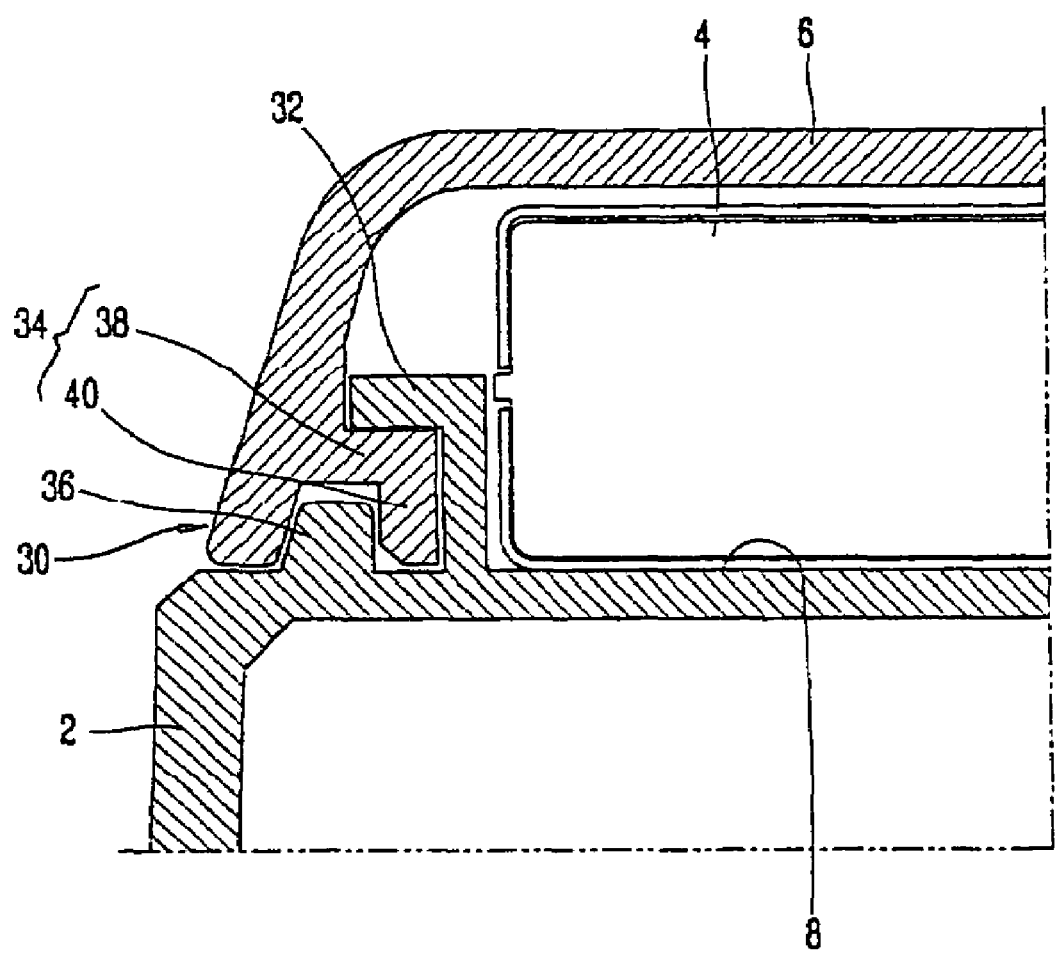
FIG. 7 is a partial sectional view showing a locking structure between the battery and the terminal body of the mobile terminal in accordance with an example embodiment of the present invention.

FIG. 7 is a partial sectional view showing a locking structure between the battery and the terminal body at the mobile terminal in accordance with an example embodiment of the present invention. Other embodiments and configurations are also within the present invention. More specifically, FIG. 7 shows that the third locking part 30 may include hooking jaws 32, hooking ribs 34 and release prevention protrusions 36. The hooking ribs 34 may be formed at both sides of the battery receiving part 8 of the terminal body 2. The hooking ribs 34 may protrude from both inner sides of the battery cover 6 and may be inserted into the hooking jaws 32. The release preventing protrusions 36 may protrude from both sides of the battery receiving part 8 and prevent the hooking rib 34 from being released from the hooking jaws 32.

The hooking jaws 32 may vertically protrude from both sides of the battery receiving part 8. The end portion of the hooking jaws 32 may be bent perpendicular in an outer direction of the battery receiving part 8.

The hooking ribs 34 may include first hooking portions 38 that protrude inwardly from both inner sides of the battery cover 6 and second hooking portions 40 bent downwardly from an end portion of the first hooking portions 38 and supported at the side of the release preventing protrusions 36.

The release preventing protrusions 36 may protrude with a certain width upwardly at certain intervals from the hooking jaws 32 at both edges of the rear surface of the terminal body 2. The release preventing protrusions 36 may support the second hooking portions 40 of the hooking ribs 34 so that the hooking ribs 34 cannot be separated from the hooking jaws 32.

The mobile terminal in accordance with example embodiments of the present invention may have several advantages. For example, when the battery 4 is mounted on the battery receiving part 8 formed at the rear surface of the terminal body 2, the locking protrusion 24 formed at the battery 4 may be locked to the locking hook 22 formed at both sides of the battery receiving part 8. The locking hook 22 may be supported by the support rib 26 formed at the cover 6 whereby the locking hook 22 is prevented from being released from the locking protrusion 24 so as to prevent separation of the battery 4 from the terminal body 2.

With the battery cover 6 mounted at the rear surface of the battery-mounted terminal body 2, when the battery cover 6 is slid in a longitudinal direction of the terminal, the first hooking portion 38 of the hooking rib 34 formed at the battery cover 6 may be caught by the hooking jaw 32 formed at both sides of the battery receiving part 8 of the terminal body 2 and the locking rib 12 formed at the battery cover 6 may be locked to the locker 16 mounted at the terminal body 2.

Since the second hooking portion 40 of the hooking rib 34 is supported by the release preventing protrusion 36 formed at the terminal body 2, the hooking rib 34 cannot be released from the hooking jaw 32 due to external impact, and the battery 4 can be prevented from being released from the terminal body 2. Accordingly, damage to a circuit component of the terminal may be prevented as the circuit is turned off.

Embodiments of the present invention may be embodied in several forms without departing from the spirit or essential characteristics thereof It should also be understood that the above-described embodiments are not limited by any of the details of the foregoing description, but rather should be construed broadly within its spirit and scope as defined in the appended claims. Therefore all changes and modifications that fall within the metes and bounds of the claims, or equivalence of such metes and bounds are therefore intended to be embraced by the appended claims.

What is claimed is:

1. A mobile terminal comprising:
a terminal body having a battery receiving part to receive a battery; and
a battery locking unit for fixing the battery to the terminal body, the battery locking unit comprising:
a hooking jaw extending from a side of the battery receiving part;
a hooking rib protruding from an inner side of a battery cover toward an inner area of the battery cover and slidably coupled to the hooking jaw; and
a release preventing protrusion protruding from the side of the battery receiving part towards inside of the terminal body, the release preventing protrusion supporting one side of the hooking rib so as to prevent release of the hooking rib from the hooking jaw, the hooking jaw being different than the release preventing protrusion, wherein the hooking rib comprises:
a first hooking portion extending from the inner side of the battery cover toward the inner area of the battery cover, and
a second hooking portion extending from an end of the first hooking portion toward the side of the terminal body.

2. The terminal of claim 1, wherein the battery is received on the battery receiving part and the battery cover is mounted at a rear side of the terminal body.

3. The terminal of claim 1, wherein the hooking jaw protrudes vertically from the side of the battery receiving part and has an end portion bent in an outward direction of the battery receiving part toward the inner side of the battery cover such that the hooking rib is provided between the end portion of the hooking jaw and the side of the battery receiving part.

4. The terminal of claim 1, wherein the first hooking portion protrudes inwardly from the inner side of the battery cover toward the inner area of the battery cover and is inserted to the hooking jaw, and the second hooking portion is bent from the end portion of the first hooking portion toward the side of the battery receiving part, and the second hooking portion being supported by the release preventing protrusion.

5. The terminal of claim 1, wherein the release preventing protrusion protrudes from an edge of a rear surface of the terminal body and supports the second hooking portion of the hooking rib so that the hooking rib may not be separated from the hooking jaw.

6. The terminal of claim 1, wherein the release preventing protrusion protrudes from the side of the battery receiving part such that the release preventing protrusion is provided between the inner side of the battery cover and the hooking jaw.

7. The terminal of claim 1, wherein the hooking jaw is adjacent the battery when the battery is in the battery receiving part.

8. A mobile terminal comprising:
a terminal body having a battery receiving part to receive a battery; and
a battery locking unit for fixing the battery to the terminal body, the battery locking unit comprising:
a locking hook protruding from a side of the battery receiving part toward a battery cover;
a locking protrusion protruding from a side of the battery to lock with the locking hook; and
a support rib formed on a first inner side of the battery cover to prevent the locking hook from being released from the locking protrusion, the battery cover including the first inner side, a second inner side and a surface provided between the first inner side and the second inner side so as to cover the battery when the battery is provided within the battery receiving part, wherein the support rib protrudes inwardly from the first inner side of the battery cover toward the locking hook so as to face the locking hook.

9. The terminal of claim 8, wherein the battery is received on the battery receiving part and the battery cover is mounted at a rear side of the terminal body.

10. The terminal of claim 8, wherein an interval (T) between the locking hook and the support rib is smaller than an interval (S) where the locking hook and the locking protrusion overlap.

11. The terminal of claim 10, wherein the interval (S) where the locking hook and the locking protrusion overlap is approximately 0.4 mm, and the interval (T) between the support rib and the locking hook is approximately 0.2 mm.

12. A mobile terminal comprising:
a terminal body having a battery receiving part to receive a battery; and a battery locking unit for fixing the battery to the terminal body, the battery locking unit comprising:
- a first locking unit including a locking hook vertically protruding from a side of the battery receiving part, a locking protrusion protruding from the battery to lock with the locking hook, and a support rib formed at an inner side of a battery cover to prevent the locking hook from being released from the locking protrusion; and
- a second locking unit including a hooking jaw protruding from a side of the battery receiving part in a first direction, a hooking rib protruding inwardly from an inner side of the battery cover and inserted into the hooking jaw, and a release preventing protrusion protruding from the side of the battery receiving part in the first direction towards inside of the terminal body for supporting one side of the hooking rib so as to prevent release of the hooking rib from the hooking jaw, the hooking rib being different than the release preventing protrusion.

13. The terminal of claim 12, wherein the battery is received on the battery receiving part and the battery cover is mounted at a rear side of the terminal body.

14. The terminal of claim 12, wherein the support rib protrudes inwardly at a certain width from the inner side of the battery cover and faces the locking hook.

15. The terminal of claim 12, wherein an interval (T) between the locking hook and the support rib is smaller than an interval (S) where the locking hook and the locking protrusion overlap.

16. The terminal of claim 15, wherein the interval (S) where the locking hook and the locking protrusion overlap is approximately 0.4 mm, and the interval (T) between the support rib and the locking hook is approximately 0.2 mm.

17. The terminal of claim 12, wherein the hooking jaw protrudes vertically from the side of the battery receiving part in the first direction and has an end portion bent in an outward direction of the battery receiving part toward the inner side of the battery cover such that the hooking rib is provided between the end portion of the hooking jaw and the side of the battery receiving part.

18. The terminal of claim 12, wherein the hooking rib comprises:
- a first hooking portion protruding inwardly from the inner side of the battery cover and is inserted to the hooking jaw; and
- a second hooking portion bent from the end portion of the first hooking portion toward the side of the battery receiving part and the second hooking portion being supported by the release preventing protrusion.

19. The terminal of claim 18, wherein the release preventing protrusion protrudes from an edge of a rear surface of the terminal body and supports the second hooking portion of the hooking rib so that the hooking rib may not be separated from the hooking jaw.

20. The terminal of claim 12, wherein the hooking jaw is adjacent the battery when the battery is in the battery receiving part.

21. A mobile terminal comprising:
a battery receiving part to receive a battery; and
a battery locking unit comprising:
- a hooking jaw extending from the battery receiving part to receive the battery;
- a hooking rib on a battery cover; and
- a protrusion on the battery receiving part to prevent the hooking rib from releasing from the hooking jaw, wherein the hooking rib includes:
  - a first hooking portion extending inwardly from an inner side of a battery cover toward an area for holding the battery; and
  - a second hooking portion extending from an end of the first hooking portion, wherein the protrusion is provided between a portion of the inner side of the battery cover and the second hooking portion of the hooking rib when the battery cover is mounted by the battery locking unit, and wherein the hooking jaw protrudes from a side of the battery receiving part and has an end portion bent in an outward direction of the battery receiving part toward the inner side of the battery cover such that the second hooking portion is provided between the end portion of the hooking jaw and the battery receiving part.

22. The terminal of claim 21, wherein the first hooking portion extends inwardly from the inner side of the battery cover and is inserted to the hooking jaw; and
the second hooking portion is bent from the end portion of the first hooking portion toward a side of the battery receiving part, and the second hooking portion is supported by the protrusion.

23. The terminal of claim 22, wherein the protrusion protrudes from an edge of a surface of a terminal body and supports the second hooking portion so that the hooking rib may not be separated from the hooking jaw.

24. The terminal of claim 21, wherein the battery locking unit further comprises:
- a locking hook on the battery receiving part;
- a locking protrusion on the battery to couple to the locking hook; and
- a support rib on the battery cover to maintain the coupling of the locking protrusion and the locking hook.

25. The terminal of claim 24 wherein the support rib protrudes from an inner side of the battery cover so as to face the locking hook.

26. The terminal of claim 24, wherein an interval (T) between the locking hook and the support rib is smaller than an interval (S) where the locking hook and the locking protrusion overlap.

27. The terminal of claim 26, wherein the interval (S) where the locking hook and the locking protrusion overlap is approximately 0.4 mm, and the interval (T) between the support rib and the locking hook is approximately 0.2 mm.

28. The terminal of claim 21, wherein the hooking jaw extends from a surface of the battery receiving part in a first direction, and the protrusion extends from the surface of the battery receiving part in the first direction.

29. A mobile terminal comprising:
a battery receiving part to receive a battery; and
a battery locking unit comprising:
- a locking hook on the battery receiving part to receive the battery;
- a locking protrusion on the battery to couple to the locking hook; and
- a support rib on the battery cover to maintain the coupling of the locking protrusion and the locking hook, wherein the battery cover includes a first inner side, a second inner side and a surface of the battery cover provided between the first inner side and the second inner side to cover the battery when the battery is provided within the battery receiving part, and the support rib protruding in a first direction from the first inner side toward the locking hook such that an interval (S) where the locking hook and the locking protrusion overlap is approximately 0.4 mm, and an interval (T) between the support rib and the locking hook is approximately 0.2 mm in the first direction.

30. The terminal of claim 29, wherein the support rib protrudes from the first inner side of the battery cover so as to face the locking hook.

31. The terminal of claim 29, wherein the battery locking unit further comprises:
   a hooking jaw on the battery receiving part;
   a hooking rib on the battery cover; and
   a protrusion on the battery receiving part to prevent the hooking rib from releasing from the hooking jaw.

32. The terminal of claim 31, wherein the hooking jaw protrudes from a side of the battery receiving part and has an end portion bent in an outward direction of the battery receiving part.

33. The terminal of claim 31, wherein the hooking rib comprises:
   a first hooking portion protruding from a side of a battery cover and is inserted to the hooking jaw; and
   a second hooking portion bent from an end portion of the first hooking portion toward a side of the battery receiving part, and the second hooking portion is supported by the protrusion.

* * * * *